Feb. 28, 1967 M. S. RUBIN 3,306,638
ELECTRICAL CONNECTION ELEMENT FOR WIRING CONDUIT
Filed Jan. 23, 1964

INVENTOR.
MORTON S. RUBIN
BY David A. Rich

ATTORNEY.

United States Patent Office 3,306,638
Patented Feb. 28, 1967

3,306,638
ELECTRICAL CONNECTION ELEMENT FOR
WIRING CONDUIT
Morton S. Rubin, 6 Risley Road,
West Newton, Mass. 02165
Filed Jan. 23, 1964, Ser. No. 339,635
1 Claim. (Cl. 285—158)

The present invention relates to electrical wiring conduit. More particularly the invention relates to an electrical connection element for wiring conduit.

In the prior art wiring conduit is typically engaged mechanically and electrically to a junction box by means of a threaded end connector which is inserted in an orifice in the box and a threaded nut threaded to the engagement end of the connector. Such a connector provides a relatively poor electrical connection to the wall of the junction box and is time-consuming to utilize.

In the prior art another type of threaded connector for attaching armoured cable to a junction wall is disclosed in Patent No. 2,859,984, issued to M. Thomas, November 11, 1958. The connector disclosed therein is distinguishable from that of the present invention in that a separate element is required which is inserted from within the junction box and threaded into the cable. In contrast the complete insertion operation may be performed with the connector of the present invention external to the box.

A bushing coupling is disclosed in Patent No. 848,819, issued to C. A. Freeman on April 2, 1907, which also requires a separate element inserted from within the wall of a junction box in order to effect a connection.

A combination screw and rivet is disclosed in Patent No. 2,321,370, issued to E. M. Green, June 8, 1943. The combination screw and rivet disclosed therein utilizes a helical thread of tapered cross-section which surrounds a cylindrical body portion. The rivet is inserted in an orifice in each of a pair of juxtaposed sheets and rotated to force the two sheets together. This combination screw and rivet is distinguishable from the electrical connector of the present invention both in structure and in application. The helical threaded end of the electrical connector of the present invention is in tapered spaced relation to a perpendicular stop surface of the connector. In contrast the helical thread of the rivet is parallel to the stopping surface.

It is therefore an object of the present invention to provide an improved electrical connection element for wiring conduit which provides an improved electrical connection.

A further object of the invention is to provide an improved electrical connection element for wiring conduit which provides an improved mechanical connection.

Still another object of the invention is to provide an improved electrical connection element for wiring conduit which facilitates the ready engagement with a junction box by insertion operations external to the wall of the box.

In accordance with the invention there is provided an electrical connection element for wiring conduit. The element includes a metallic tube adapted to receive a metallic tubular conduit shell covering. The tube has an engagement end adapted to engage a metallic junction box in mechanical and electrical connection. An annular flange stop is integrally formed around the tube and has a perpendicular stop surface adjacent the engagement end. An element is integrally formed around the engagement end of the tube in tapered spaced relation to the perpendicular surface, whereby, rotation of the tube within an orifice in the junction box effects the electrical and mechanical connection thereto.

Other and further objects of the invention will be apparent from the following description taken in connection with the accompanying drawing, and its scope will be pointed out in the appended claim.

Figure 1:
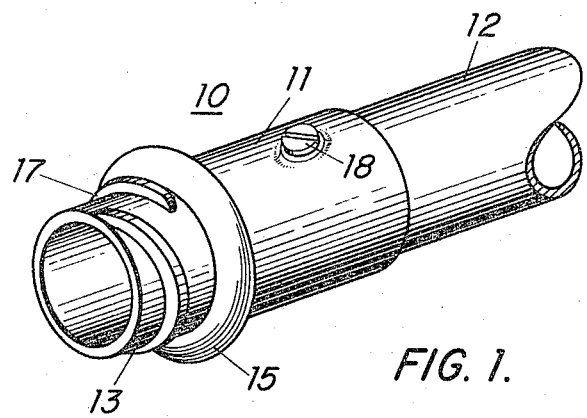
FIG. 1 is a perspective view of a connection element embodying the invention.
Figure 2:
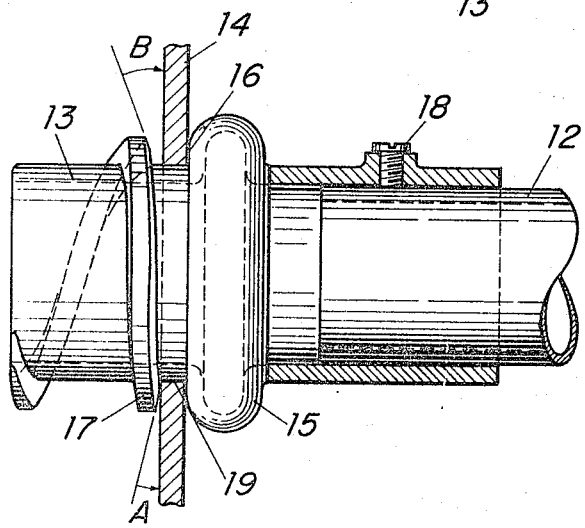
FIG. 2 is a side view showing the element of FIG. 1 engaged to the wall of a junction box.

Referring now to the drawing with particular reference to FIGS. 1 and 2 there is here illustrated an electrical connection element for wiring conduit embodying the invention. The connection element is generally indicated at 10. The element includes a metallic tube 11 adapted to receive a metallic tubular conduit shell covering 12. The element has an engagement end 13 which is adapted to engage the wall of a metallic junction box 14 in mechanical and electrical connection. An annular flange stop 15 is integrally formed around the tube and has a perpendicular stop surface 16 adjacent the engagement end. An engagement element 17 in the form of a helical thread and having a tapered cross-section is integrally formed around the engagement end of the tube 11 in tapered spaced relation to the perpendicular surface as shown. A set screw 18 is carried in a threaded hole in the tube 11 for engagement with the shell covering 12. The engagement end of the connection element is inserted in an orifice 19 formed in the wall of the junction box. The connection element is preferably rotated less than 360° within the orifice to effect an electrical and mechanical connection to the wall of the junction box.

Figure 3:
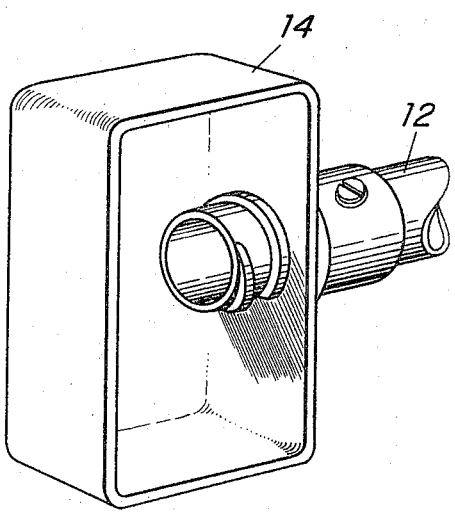
FIG. 3 is a perspective view of the connector of FIG. 1 shown in engagement with a junction box.

Referring to FIG. 3 the connection element of the invention is shown inserted in the orifice of the junction box 14.

In operation the connection element is inserted in the orifice and rotated in order to force the wall of the junction box 14 into electrical and mechanical connection between the surface of the helical thread 17 and the perpendicular surface 16 of the annular ring 15. The angle A indicated in FIG. 2 shows the degree of taper by which a wedging action takes place to force the wall between the two surfaces and further to account for differences in the diameters of the orifice 19. Similarly, the angle B indicates the taper of the thread relative to the surface 16 of the annular flange stop 15 in order to wedge-fit the wall and connector and to compensate for variations in thicknesses of the wall of the junction box 14.

It will be apparent from the foregoing description that the present invention presents an electrical connection element which greatly facilitates the ease of engagement of a wiring conduit to a junction box. Because of the wedging action of the tapered cross-section of the helical thread as well as the tapered spaced relation between the thread and the stop surface 16, an extremely tight mechanical connection is obtained. In addition, the electrical connection is very securely effected. A principal advantage of the connector lies in the ability to insert the connector externally to the box with a single motion involving substantially less than 360° of rotation.

While there has hereinbefore been presented what is at present considered to be the preferred embodiment of the invention, it will be apparent to those of ordinary skill in the art that many and various changes and modifications may be made wih respect to the embodiment described and illustrated without departing from the spirit of the invention. It will be understood, therefore, that all such changes and modifications as fall fairly within the scope of the present invention, as defined in the appended claim, are to be considered as a part of the present invention.

What is claimed is:

A unitary electrical conduit connector adapted to engage a junction box wall from outside said box with a simple insertion and twist motion, comprising:
- a one piece integral metallic tube member of substantially constant wall thickness;
- an outwardly radially extending flange stop bulge intermediate the ends of said member, said bulge being formed with one face substantially normal to the axis of the tube;
- a tapered box thread integrally formed in the outer surface of the tube starting at one end with a high pitch, the pitch gradually diminishing until the flank of the thread becomes substantially parallel to said normal face, said thread terminating at a distance from said normal face of said flange stop bulge substantially less than the thickness of said junction box wall whereby a secure mechanical and electrical connection may be effected for holes in said junction box wall of varying diameter and varying junction box wall thicknesses; and
- a set screw carried in the other end of said tube and extensible through the tube wall for securing said connector to an electrical wiring conduit.

References Cited by the Examiner

UNITED STATES PATENTS

| | | | |
|---|---|---|---|
| 1,062,635 | 5/1913 | Clements | 285—209 X |
| 1,618,720 | 2/1927 | Moore | 285—192 X |
| 2,111,243 | 3/1938 | Hecht | 285—161 X |
| 2,535,658 | 12/1950 | Strom | 285—158 |
| 2,859,984 | 11/1958 | Thomas | 285—158 |

FOREIGN PATENTS 106,651   5/1917   Great Britain.

CARL W. TOMLIN, *Primary Examiner.*